United States Patent
Kim

(10) Patent No.: US 7,136,111 B2
(45) Date of Patent: Nov. 14, 2006

(54) CHANNEL EQUALIZER AND DIGITAL TV RECEIVER USING THE SAME

(75) Inventor: Joon Tae Kim, Yongin-si (KR)

(73) Assignee: LG Electronics Inc, Seoul (KR)

(*) Notice: Subject to any disclaimer, the term of this patent is extended or adjusted under 35 U.S.C. 154(b) by 578 days.

(21) Appl. No.: 10/631,836

(22) Filed: Aug. 1, 2003

(65) Prior Publication Data

US 2004/0021795 A1    Feb. 5, 2004

(30) Foreign Application Priority Data

Aug. 1, 2002    (KR)    ............... 10-2002-0045575

(51) Int. Cl.
*H04N 5/21* (2006.01)
(52) U.S. Cl. ..................... 348/614; 348/607
(58) Field of Classification Search ............... 348/614, 348/607, 624, 914; 375/229, 232, 286, 346, 375/260; *H04N 5/21, 5/213*
See application file for complete search history.

(56) References Cited

U.S. PATENT DOCUMENTS 6,754,262 B1 *    6/2004    Citta et al. ................ 375/232
6,771,591 B1 *    8/2004    Belotserkovsky et al. .. 375/232

\* cited by examiner

*Primary Examiner*—Sherrie Hsia
(74) *Attorney, Agent, or Firm*—Birch, Stewart, Kolasch & Birch, LLP

(57) ABSTRACT

A channel equalizer of a terrestrial digital TV receiver using a VSB modulation method is disclosed. By using a precise channel estimator according to the LS method, the transmission channel can be precisely estimated regardless of the characteristic of the transmission channel. By performing the channel equalization in the frequency domain based on the estimated channel, since the channel can be precisely compensated for, and a firm frame synchronization is supplied even to the time-varying multiple path channel, it can be exhibited superior performance even a mobile channel. Moreover, since the FFT implemented by hardware simpler than the transversal filter of the time domain can be used, the equalization is performed not the time domain but the frequency domain, a longer equalizing range can be obtained.

28 Claims, 7 Drawing Sheets

CHANNEL EQUALIZER AND DIGITAL TV RECEIVER USING THE SAME

This nonprovisional application claims priority under 35 U.S.C. § 119(a) on Patent Application No(s). 2002-0045575 filed in KOREA on Aug. 1, 2002, which is (are) herein incorporated by reference.

This application claims the benefit of the Korean Application No. P 2002-45575 filed on Aug. 1, 2002, which is hereby incorporated by reference.

BACKGROUND OF THE INVENTION

1. Field of the Invention

The present invention relates to a channel equalizer of a terrestrial digital television (TV) receiver using a vestigial side band (VSB) modulation.

2. Discussion of the Related Art

Generally, a terrestrial television (TV) signal, which is transmitted from a transmitting terminal by using a vestigial sideband (VSB) system, arrives to a receiving terminal after passing through a multi-path channel. However, the arriving signal is seriously distorted by an Inter Symbol Interference (ISI), so that a channel equalizer should be adopted in order to remove the interference and restore the original signal.

There is a nonlinear decision feedback equalizer as the most channel equalizer adopted in a receiver for a single carrier transmission system such as the present VSB system. Since the nonlinear decision feedback equalizer works in a time domain and uses a least mean square (LMS) with a small operation amount for updating coefficient, its convergence speed is slow, but has an advantage that the implementation is simple and easy.

If the channel distortion is serious, that is, an output of the time domain decision feedback equalizer does not remove all of the ISI or the channel has a big sudden variation during normal operation, the decision value for determining the output of the nonlinear decision feedback equalizer is very different from an original signal. In this case, the miss-determined decision value is inputted into the equalizer of a feedback portion again so that the output from the nonlinear decision feedback equalizer may be deteriorated more and more, that is, there may be occurred kind of an error propagation phenomenon. Moreover, after the error propagation phenomenon is occurred, since the equalizer shows a hysteresis symptom that cannot be re-converged and remains at the deteriorated state even though the state of the transmission channel is improved, the equalizer has an equalizing performance limit under a serious static multi-path channel.

Moreover, since the time domain equalizer such as the nonlinear decision feedback equalizer works in a manner of remaining only a main path with the largest energy among the multi-path and removing all the ISI component corresponding to the rest path, the time domain equalizer cannot be stably operated when a position of the main path since such as a time varying channel not a static channel is varied, so that a frame synchronization is frequently broken. The frame synchronization should be necessary in the course of a channel decoding performed after the equalizer, and if the synchronization is broken, the channel decoding becomes impossible.

In a case of a transmission channel for the terrestrial TV, the time difference causes by the multi-path often becomes more than several tens of ps due to the characteristics of very sensitively responding to effect from the configuration of the ground and building on the ground. In a time domain equalizer working at a symbol rate (10.76 MHz), in order to restore the original signal from multi-path signal entering with the great time difference, the length of a filter of the time domain equalizer should be greater than several hundreds of tabs at minimum on the basis of a center tab. As described above, as a demand for a spread of equalizing time domain is gradually increased in the terrestrial TV receiver, the extension of the length of the time domain adapting an equalizing filter has a limit for implementation.

SUMMARY OF THE INVENTION

Accordingly, the present invention is directed to a channel equalizer and a digital TV receiver using the same that substantially obviate one or more problems due to limitations and disadvantages of the related art.

An object of the present invention is to provide a channel equalizer capable of always outputting uniform performance regardless of the intensity of distortion and the number of paths by performing the channel equalization of a terrestrial TV signal transmitted in a vestigial side bad system in a frequency domain, and a digital TV receiver using the same.

Another object of the present invention is to provide a channel equalizer of which the data frame synchronization always has a uniform characteristic even in a time-variable multi-path channel, and a digital TV receiver using the same.

Still another object of the present invention is to provide a channel equalizer which always displays an equal performance regardless of the intensity of distortion and the number of multi-paths by implementing a zero forcing channel equalizer to obtain a precise transmission channel through a least square type channel predictor and to remove the ISI based on the obtained transmission channel in a frequency domain.

Still another object of the present invention is to provide a channel equalizer having a stable receiving performance even in a mobile receipt environment as well as a fixed receipt environment by overcoming a disadvantage of a time varying equalizer (for example, a frame error occurred by which a synchronization of a data frame of the equalizer frequently varies according to a main path) by maintaining the data frame synchronization of an output of the channel equalizer an equal characteristic all the time even the time varying multi-path channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a channel equalizer includes a channel estimation unit for estimating a finite impulse response estimation value of a channel by estimating an impulse response of a transmission channel from a received signal having passed through the channel, and a channel distortion compensation unit for compensating for the channel distortion of the received signal by using the time impulse response estimated in a frequency domain after converting the received signal and the estimated impulse response into the frequency domain, respectively, and for converting the received signal into a time domain again.

In the present invention, the channel estimation unit includes a cross-correlation value generator for detecting a training time and calculating a cross-correlation value p(n) between a training sequence having passed through the channel during the training time and a predetermined training sequence in a receiver, an instantaneous estimation unit for estimating an instantaneous channel value by performing a matrix multiplication of coefficients of an inverse matrix of an autocorrelation matrix of a predetermined training signal and cross-correlation values, and an estimation channel filter for calculating a mean value between a pre-stored estimation channel of a previous frame and a present instantaneous channel being outputted from the instantaneous channel estimation unit and outputting the mean value.

In the present invention, the channel distortion compensation unit includes a first Fast Fourier Transform unit for transforming the received signal from the time domain to a frequency domain, a second Fast Fourier Transform unit for transforming the channel impulse response estimated in the channel estimation unit from the time domain to the frequency domain, a ROM for storing inverse values of the channel impulse response transformed into the frequency domain in a form of table, a complex multiplier for correcting the distortion of the received signal in the frequency domain outputted from the first Fast Fourier Transform unit by using a signal outputted from the ROM, and an inversed Fast Fourier Transform unit for inverse-transforming the frequency domain signal outputted from the complex multiplier into the time domain.

In still another aspect of the present invention, the channel distortion compensation unit includes a 1x→2x converter for enabling 2x Fast Fourier Transform by superposing a data block of a signal being received on a previous data block, a zero padding machine for padding the estimated channel impulse response in the channel estimation unit with 0 (zero) to be suitable a 2x Fast Fourier Transform block, a first Fast Fourier Transform unit for converting a 2x data block of the 1x→2x converter into the frequency domain, a second Fast Fourier Transform unit for converting the estimated channel impulse response padded with 0 (zero) into the frequency domain, an address generator for generating an address by squaring a real number and a complex number outputs of the second Fast Fourier Transform unit and adding the squared numbers, a ROM for pre-storing an inverse value of the channel impulse response and outputting an inverse value corresponding to an address of the address generator, a multiplier for multiplying an output value from the ROM to the real number and the complex number of the second Fast Fourier Transform respectively, a complex multiplier for performing a complex-multiplication of a complex output value of the frequency domain receipt data outputted from the first Fast Fourier Transform unit with a complex output value of the multiplier, an inverse Fast Fourier Transform unit for inverse-converting an output value from the complex multiplier into the time domain, and a 2x→1x converter for extracting only data of 1x block from the inverse Fast Fourier Transform unit.

In still another aspect of the present invention, a channel equalizer further includes a noise removing unit for estimating an enhanced noise for the equalization from the output of the channel distortion compensation unit and for removing the enhanced noise and a vestigial symbol interference component contained in the time domain signal.

The noise removing unit includes a noise predictor for estimating an enhanced noise by extracting only colored noise from the output of the channel distortion compensation unit, and a subtracter for whitening the noise by subtracting the noise predicted by the noise predictor the output from the channel distortion compensation unit.

The noise removing unit includes a selector for selecting the training sequence during the training period and a determined value of the noise-removed signal during the data block and outputting the selected signal as an original signal, a first subtracter for extracting only the colored noise by subtracting the output of the selector from the output of the channel distortion compensation unit, a noise predictor for receiving and delaying an output from the first subtracter and estimating the enhanced noise by using the delayed value, a second subtracter for whitening the noise by subtracting the noise predicted in the noise predictor from the output of the channel distortion compensation unit, and a determiner for determining the noise of which the enhanced noise is removed in the second subtracter and outputting the determined result to the selector.

In still another aspect of the present invention, a channel equalizer includes a channel estimation unit for estimating a finite impulse response estimation value of a channel by estimating an impulse response of a transmission channel from a received signal having passed through the channel, a channel distortion compensation unit for compensating for the channel distortion of the received signal by using the time impulse response estimated in a frequency domain after converting the received signal and the estimated impulse response into the frequency domain, respectively, and for converting the received signal into a time domain again, and a noise removing unit for estimating a noise enhanced during the equalizing from the output of the channel distortion compensation unit and for removing an enhanced noise and a vestigial symbol interference component contained in the time domain signal.

In still another aspect of the present invention, a digital TV receiver utilizing a channel equalizer includes a tuner for selecting a desired frequency of a channel by tuning when a vestigial sideband modulated signal is received through an antenna and converting the selected frequency into an intermediate frequency signal, a demodulator for digitalizing the intermediate signal outputted from the tuner and demodulating the digitalized signal into a baseband signal, a channel estimation unit for estimating a finite impulse response estimation value of a channel by estimating an impulse response of a transmission channel from the output signal of the demodulator, a channel distortion compensation unit for compensating for the channel distortion of the received output signal by using the time impulse response estimated in a frequency domain after converting the received output signal and the estimated impulse response into the frequency domain, respectively, and for converting the received output signal into a time domain again, a noise removing unit for estimating a noise enhanced during the equalizing from the output of the channel distortion compensation unit and for removing an enhanced noise and a vestigial symbol interference component contained in the time domain signal, and an error correcting unit for correcting a phase and error of data outputted from the noise removing unit and outputting the corrected data for decoding.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The present invention performs a channel equalization of a terrestrial wave TV signal by a vestigial sideband system in a frequency domain.

Figure 1:
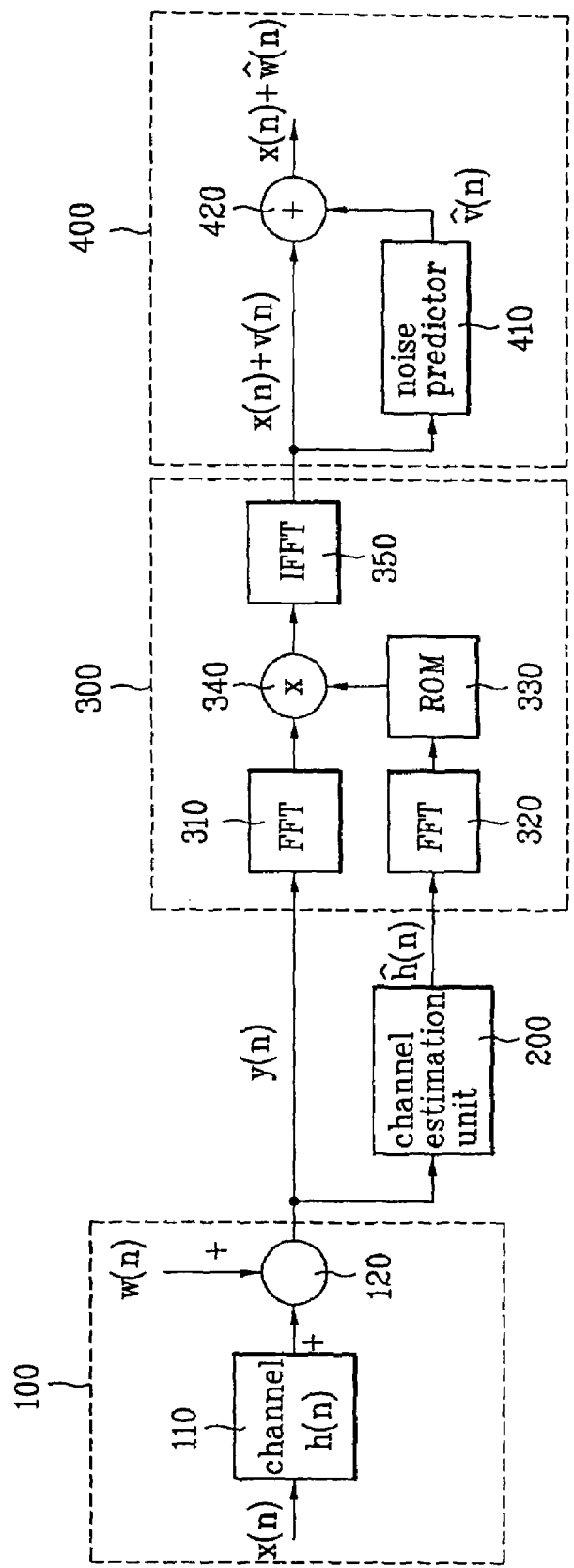
FIG. 1 illustrates a block diagram showing an entire construction a channel equalizer according to the present invention.

FIG. 1 illustrates a block diagram showing an entire construction a channel equalizer according to the present invention, the channel equalizer includes a channel unit 100 disposed a transmitting terminal and a receiving terminal, and a frequency domain channel equalizing unit for restoring an original signal from a terrestrial TV receiving signal added with a white noise by the channel unit 100.

The channel unit 100 includes a adder 120 adding the white noise w(n) to the terrestrial TV receiving signal x(n) having passed through a multi-path channel 110, the terrestrial TV receiving signal y(n) added with the white noise is inputted into the frequency domain channel equalizing unit.

The frequency domain channel equalizing unit includes a channel estimation unit 200 for estimating a path of a transmission channel (impulse response) from a received signal y(n), a channel distortion compensation unit 300 for compensating for a channel distortion of the received signal from the channel unit 100 by using the time impulse response estimated in the frequency domain by the channel estimation unit 200, and a noise removing unit 400 for removing an enhanced noise and a vestigial symbol interference component contained in a time domain signal outputted from the channel distortion compensation unit 300 by estimating the enhanced noise for equalization from the output from the channel distortion compensation unit 300.

The channel distortion compensation unit 300 includes a first Fast Fourier Transform (hereinafter referred to FFT) unit 310 for transforming the signal y(n) received through the channel unit 100 from the time domain to the frequency domain, a second FFT unit 320 for transforming the channel impulse response ĥ(n) estimated in the channel estimation unit 200 from the time domain to the frequency domain, a ROM 330 for storing inverse values of the channel impulse response transformed into the frequency domain in a form of table, a multiplier 340 for correcting the distortion of the received signal in the frequency domain outputted from the first FFT unit 310 by using a signal outputted from the ROM 330, and an inversed FFT unit 350 for inverse-converting the signal in the frequency signal domain outputted from the multiplier 340.

The noise removing unit 400 includes a noise predictor 410 for estimating an enhanced noise by extracting only colored noise from the output of the channel distortion compensation unit 300, and a subtracter 420 for whitening the noise by subtracting the noise predicted by the noise predictor 410 the output from the channel distortion compensation unit 300.

The channel equalizer constructed as described above will be now described in detail as follows.

First, the channel estimation unit 200 will be described.

As illustrated in FIG. 1, the channel estimation unit 200 received data y(n) through the channel unit 100, estimates an impulse response h(n) of the discrete equivalent 110 which the original signal x(n) may pass through, and outputs a finite impulse response estimation value ĥ(n) of a channel.

At that time, the channel estimation unit 200 operated in the time domain is generally divided into a least square (hereinafter LS) estimation system for estimating by using only a training sequence, and a sub-channel response matching system for estimation by using the signal together data. The former has disadvantages that, the precise channel estimation can be achieved when only the training sequence is, however, if the training sequence were inserted into between data, the data serves as noise in the estimation so that the estimation error is increased. Since the latter performs the estimation well only when an order of the channel (or length of the impulse response) is precisely known, the latter is not suitable to a state that the characteristic of the channel varies like the terrestrial channel.

Therefore, the present invention proposes novel LS channel predictor for using only the training sequence without effect from data.

For this, a frame structure (See FIG. 2) of the data transmitted such a vestigial sideband (hereinafter referred to VSB) system and the training sequence can be used are described hereinafter.

Figure 2:
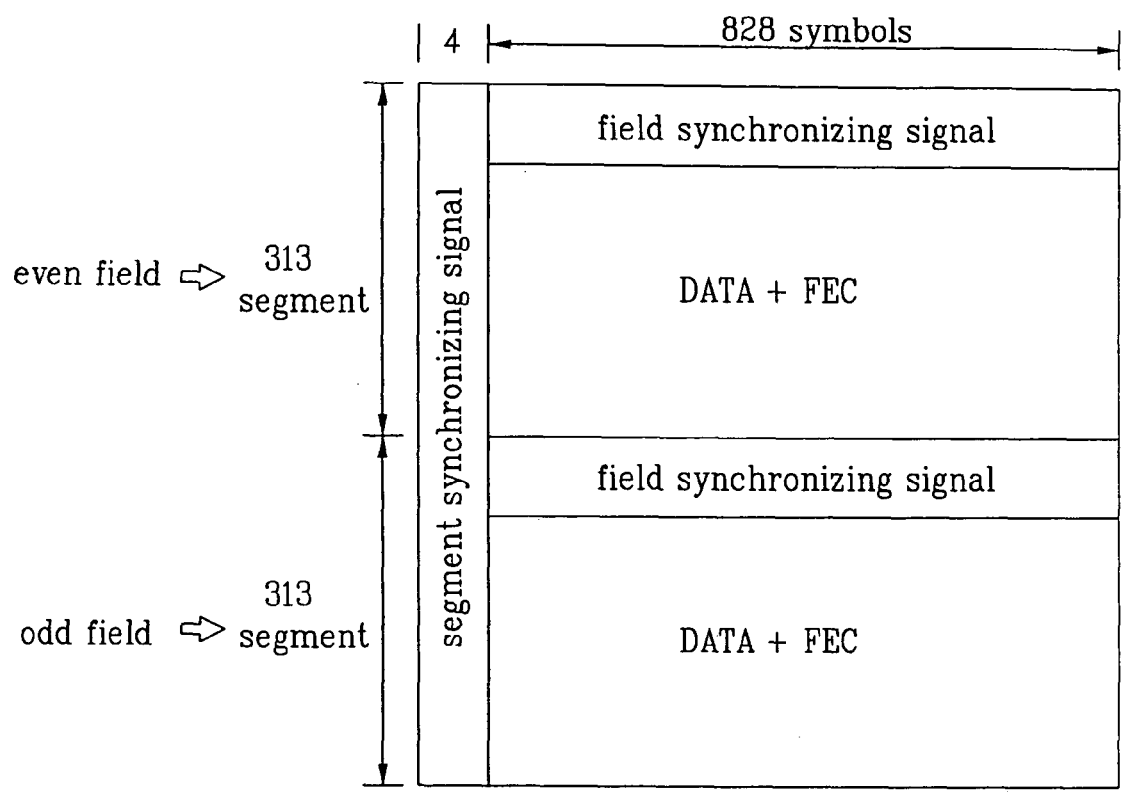
FIG. 2 illustrates a block diagram showing a data frame of a vestigial sideband transmission system according to a related art.
Figure 3:
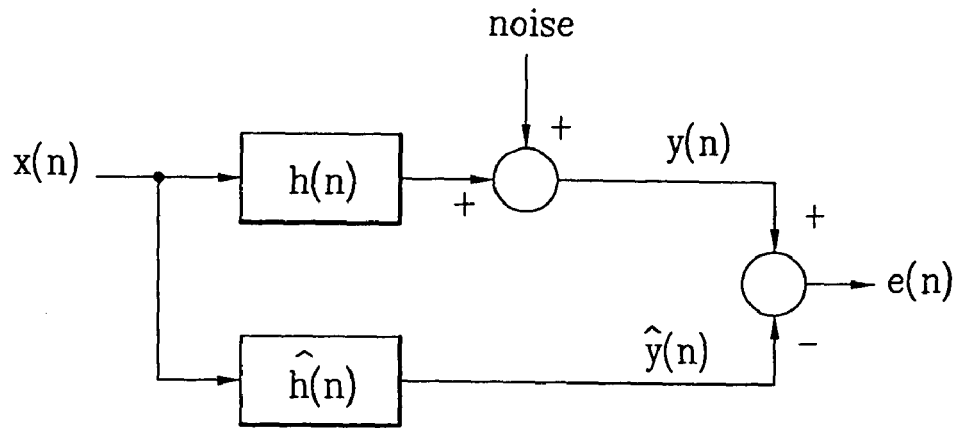
FIG. 3 illustrates a block diagram of an unknown system identification model according to the present invention.

FIG. 2 illustrates a block diagram showing a data frame of a conventional VSB transmission system, and FIG. 3 illustrates a block diagram of an unknown system identification model according to the present invention;

As illustrated in FIG. 2; single frame of the data being transmitted by the VSB system divided into an odd field and an even field of which each field is divided into 313 segments.

A first segment among the segments includes a predetermined training sequence (namely, 4+511+63*3=704 symbols), a VSB mode signal being unchangeable after detecting (namely, 24 symbols), a reserved signal for the future (namely, 92 symbols), and a signal copied a final data of a previous field (namely, 12 symbols). At that time, a data segment synchronizing signal exists in a first four symbols among the predetermined training sequence (namely, 704 symbols), and next, pseudo random sequences, namely, PN 511, PN 63, PN 63, and PN 63 exist. Here, a polarity of the second PN 63 among the three PN 63 blocks varies. Namely, '1' is changes into '0' and '0' into '1'. Therefore, according to the polarity of the second PN 63, single frame can be divided into even/off field.

The rest 312 segments consist of 828 symbols except for 4 symbols of segment synchronization signal per each segment.

At that time, 728 symbols can be used as the training sequence when the reserved symbol is not utilized from the segment 832 symbols, and the estimation for a precise channel can be achieved by using maximum 820 symbols as the training sequence when to contain even the reserved symbol by utilizing the recommendation of the ATSC standard (the reserved symbol contains the PN 63 sequence repeatedly, if not special case).

Moreover, since the estimated channel is updated once per a first segment of each field and there are 41.318 fields per one second, the update rate of the estimated channel may be about 41 Hz.

Meanwhile, the channel estimation by using the LS method, as illustrated in FIG. 3, is identified to a parameter estimation matter for unknown system identification. Here, $x(n)$ is a pre-known signal and assumed to have a value existing only L finite time domain represented with the following equation 1.

$$x(n) = \begin{cases} t(n), & \text{if } 0 \le n \le L-1 \\ 0, & \text{Otherwise} \end{cases} \quad \text{[Equation 1]}$$

where, $t(n)$ is the training sequence. Meanwhile, let assume $h(n)$ a discrete time equivalent channel, $y(n)$ an output added with a white noise and passed, and $\hat{h}(n)$ an estimated value of the $h(n)$ with a finite length N and capable of being represented as the following equation 2.

$$\hat{h} = [\hat{h}(-N_a)\hat{h}(-N_a+1) \ldots \hat{h}(0) \ldots \hat{h}(N_c-1)\hat{h}(N_c)]^T \quad \text{[Equation 2]}$$

where, $N = N_a + 1 + N_c$, $N \le L$, $N_a$ and $N_c$ are respective response length of an anti-causal and a causal component, respectively.

In this case, $\hat{y}(n)$ has a value only a finite time domain of maximum $L+N-1$ like the following equation 3.

$$\hat{y} = \begin{cases} x(n), & \text{if } -N_a \le n \le L + N_c \\ 0, & \text{Others} \end{cases} \quad \text{[Equation 3]}$$

Therefore, if a cost function J represented with square summation of an estimated error $e(n)=y(n)-\hat{y}(n)$ were expressed with the following equation 4, $$J = \sum_{n=-N_a}^{L+N_c} e(n)^2 \quad \text{[Equation 4]}$$

$$= \sum_{n=-N_a}^{L=N_c} \left[ y(n) - \sum_{k=-N_a}^{N} \hat{h}(k)x(n-k) \right]^2$$

$\hat{h}$ for minimizing the cost function J can be obtained as the following equation 5.

$$\hat{h} = R^{-1} \cdot p \quad \text{[Equation 5]}$$

where, R is an auto correlation matrix, its i-row component and a j-column component can be expressed with the following equation 6.

$$R(i, j) = \sum_{n=0}^{L+N-1} t(n-i)t(n-j), \quad 0 \le i, j \le N-1 \quad \text{[Equation 6]}$$

Meanwhile, p is a cross correlation vector of $x(n)$ and $y(n)$ and its i-th component can be expressed with the following equation 7.

$$p(i) = \sum_{n=-N_a}^{L+N_c} t(n-i)y(n), \quad 0 \le i \le N-1 \quad \text{[Equation 7]}$$

In the equation 6, since $x(n)$ is all known signal, the matrix R becomes a constant matrix of which components are all constant. Therefore, sine $R^{-1}$ is a constant matrix, if to obtain only p and to perform matrix multiplication with $R^{-1}$ like the equation 5, and then the impulse response estimated value can be directly obtained.

Here, for reference, in the equation 4, the time domain summing the square error is not entire time block but $N_a \le n \le (L+N_c)$ by the equation 3. Thus, a target domain for estimating the channel in the LS is a time domain extended by a past $N_a$ time unit and a future $N_c$ time unit from the training time containing the training sequence. It is easily understood that a channel output value $y(n)$ in another time never effect the cost function.

Since, in the above description, it is assumed that the input signal passing through the transmission channel has a value only for L training sequences and has zero value for the rest, as illustrated in the equation 5, the channel can be precisely estimated by once matrix operation.

However, the input signal really passing through the channel contains the training sequence correctly for the training time, but contains data for the rest time.

Hereinafter, for the case that the input signal containing the training sequence between data passes the channel, a method for estimating a channel from the channel output signal will be described.

Figure 4:
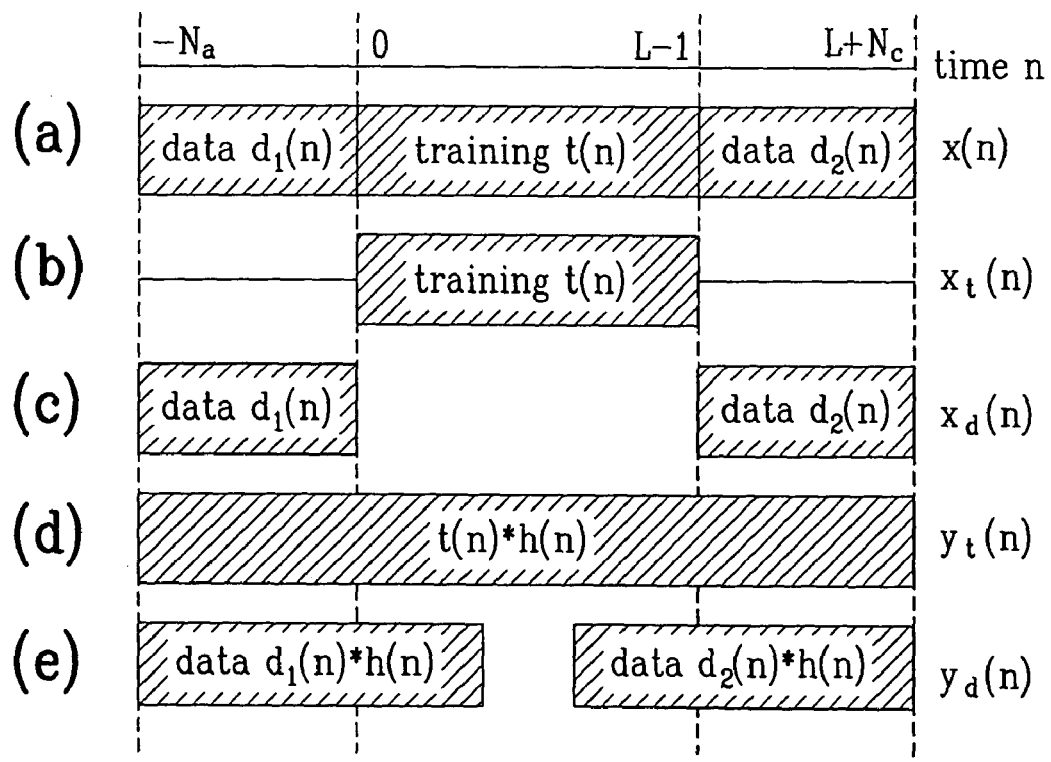
FIGS. 4A to 4E illustrate schematic views showing effect of data to a channel estimation by least square method.

FIG. 4 illustrates schematic views showing effect of data to channel estimation by LS method. The VSB transmission signal $X(n)$ illustrated in FIG. 4A can be divided into $x_t(n)$ having the training sequence value only for the training time and zero value for the rest time as illustrated in FIG. 4B, and $x_d(n)$ having zero value for the training time and the real data for the rest time as illustrated in FIG. 4C.

In this case, the signal $y(n)$ having passed through the channel is expressed the following equation 8.

$$\begin{aligned} y(n) &= h(n) * x(n) \\ &= h(n) * (x_t(n) + x_d(n)) \\ &= y_t(n) + y_d(n) \end{aligned} \quad \text{[Equation 8]}$$

Thus, the signal $y(n)$ can be regarded as a sum of two signals, respectively, having passed through the channel as illustrated in FIGS. 4D and 4E.

At that time, to substitute $y(n)$ in the equation 8 into the equation 7, then the equation 7 is expressed by the following equation 9.

$$p(i) = \sum_{n=0}^{L-1} t(n)y(n-i)$$ [Equation 9]

$$= \sum_{n=0}^{L-1} t(n)y_t(n-i) + y_d(n-1)$$

$$= p_t(i) + p_d(i)$$

In the equation 9, a first term $p_t(i)$ in the equation 9 is a cross-correlation value being used for the channel estimation, but a second item $p_d(i)$ is a cross-correlation value between the data and the training sequence and prevents th channel estimation. Here, if a fact that a signal $y_d(n)$ that a transmission data $x_d(n)$ has passed through the channel is a random variable with an average of 0 (zero) were used, the second item can be removed. Namely, both members in the equation 9 is applied with a probability expected value $E\{\cdot\}$, and then is re-expressed as the following equation 10.

$$E\{p(i)\} = E\{p_t(i)\} + E\{p_d(i)\}$$ [Equation 10]

$$= p_t(i) + E\left\{\sum_{n=0}^{L-1} t(n)y_d(n-1)\right\}$$

$$= p_t(i) + \sum_{n=0}^{L-1} t(n)E\{y_d(n-1)\}$$

$$= p_t(i)$$

Therefor, it can be understood that the second item becomes 0 (zero).

Thus, the channel estimation unit 200 obtains the channel estimation instantaneous value each every field and replaces an ensemble average with a time domain average so that the channel can be more precisely estimated by the procedure of averaging or filtering the instantaneous value.

Figure 5:
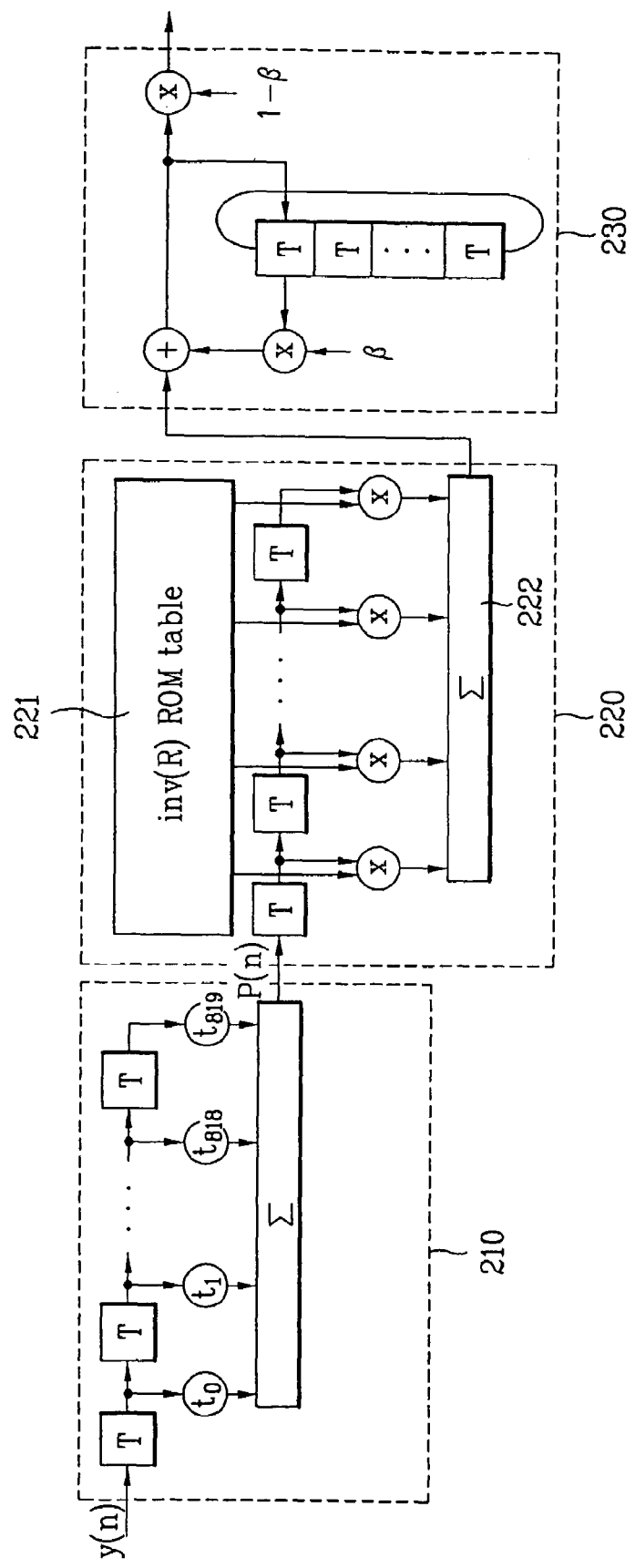
FIG. 5 illustrates a detail block diagram using the least square method of FIG. 1.

FIG. 5 illustrates a block diagram showing an example of a novel channel estimation unit using the least square method according to the present invention, the apparatus includes a cross-correlation value generator 210 for detecting a training time and calculating a cross-correlation value p(n) between a training sequence having passed through the channel during the training time and a predetermined training sequence at a receiver, an instantaneous estimation unit 220 for an instantaneous channel value $\hat{h}_i(n)$, $n=-N_a$, $-N_a+1, \ldots, 0, \ldots, N_c-1, N_c$ by matrix multiplication for estimating an instantaneous value by matrix multiplication of a coefficient of an inverse matrix $R^{-1}$ of an autocorrelation matrix of the training sequence and the cross-correlation value, and an estimation channel filter 230 for calculating a mean value $\hat{h}(n)$ between a pre-stored estimation channel $\hat{h}(n-1)$ of a previous frame and a present instantaneous channel $\hat{h}_i(n)$ being outputted from the instantaneous channel estimation unit and outputting the mean value.

The cross-correlation value generator 210 includes a delayer connected in series as much as number of the training signals for sequentially delaying the input signal, a multiplier for multiplying outputs of each delayer with a corresponding training signal, and an accumulator for accumulating all output from the multiplier.

The instantaneous channel estimation unit 220 includes a ROM table 221 for storing a minimum quantity among coefficients of the inverse matrix $R^{-1}$ of the autocorrelation matrix of the training sequence, a plurality of delayers connected in series for sequentially delaying the autocorrelation value p(n), a plurality of multipliers for outputs of each delayer with each output of the ROM table 221, and an adder 222 for estimating the instantaneous value $\hat{h}_i(n)$, $n=-N_a, -N_{a+1}, \ldots, 0, \ldots, N_{c-1}, N_c$ by adding all output from each multiplier.

Namely, the received baseband signal y(n) is inputted into the delayer of the cross-correlation value generator 210. the values y(n), y(n-1), . . . , y(n-L+1) inputted into each delayer are multiplied by the training sequence values $t_i$, $0 \leq i \leq L-1$ in each multiplier, all the multiplied values is added in the adder so as for the cross-correlation value p(n) to be obtained, and then the obtained cross-correlation value p(n) is outputted into the instantaneous channel estimation unit 220.

At that time, if the training sequence has a binary value like the VSB system, the multiplier can be replaced into a selector for outputting y(n-k) value or -y(n-k) value according to 1 or 0 (zero) of the training sequence. All the cross-correlation value generated in such manner as described above has not meaning.

As expressed in the equation 7, the cross-correlation value has meaning only when y(n) containing the training sequence having passed through the channel enters into the delayer of the cross-correlation value generator 210. Therefore, though omitted in FIG. 5, there is required a proper controller for handing the generated cross-correlation value p(n) over the instantaneous estimation unit 220, namely, an adjacent block for calculating $R^{-1} \cdot p$.

The instantaneous channel estimation unit 220[1] receives the cross-correlation values, that is, the instantaneous values $p_i$ from the cross-correlation value generator 210 and stores the instantaneous values $p_i$ into its own N (namely, $N_a+1+N_c$) delayers sequentially. The stored cross-correlation values are multiplied in respective multipliers by the values from the ROM table 221 which each column value of $R^{-1}$ is outputted in parallel, and all the multiplied N value is added in the accumulator 222 and outputted into the channel estimation filter 230.

For example, values of the value (ROM address=0 (zero)) of the first ROM table multiplied and added with the cross-correlation values means a value of $\hat{h}(-N_a)$ and an address of the ROM is increased by 1 (one). Therefore, a value resulted from the multiplication and sum of the values of the next ROM with the next cross-correlation values means $\hat{h}(-N_a+1)$. By doing so, N values can be obtained, and the obtained values form a very vector in the equation 2.

At that time, let's assume the instantaneous impulse response obtained from k-th field as $h_i(k)$ and an impulse response $h_{av}(k-1)$ averaged to a previous field, an averaged impulse response $\hat{h}_{av}(k)$ can be expressed as the following equation 11.

$$\hat{h}_{av}(k) = \beta * \hat{h}_{av}(k-1) + (1-\beta) * \hat{h}_i(k)$$ [Equation 11]

The channel estimation filter 230 is corresponded to an embodiment of the equation 11, and an averaged impulse response of the present field obtained in this way is outputted into the channel distortion compensation unit 300. At that time, since each instantaneous impulse response $h_i$ inputted into the channel estimation filter 230 is a serial signal, there is required only single channel estimation filter 230 and N delayers for storing the average impulse estimation value of the previous frame.

Hereinafter, the channel distortion compensation unit 300 for compensating for the channel distortion of the received signal in the frequency domain by using the channel estimation value obtained as described above is described in detail bellow.

Namely, if it is assumed that the transmission channel h(n) is known well, the zero forcing equalization for making ISI into 0 (zero) can be realized in the time domain or the frequency domain.

First, in the equalization in the time domain, the impulse response $h^{-1}(n)$ of the inverse channel can be obtained an operation like the following equation 12.

$$h^{-1}(n) = Z^{-1}\left\{\frac{1}{H(z)}\right\} \quad \text{[Equation 12]}$$

where, H(z) is a Z transform of h(n). Since $h(n)*h^{-1}(n) = \delta(n)$, the original signal x(n) can be obtained by convolution of the impulse response $h^{-1}(n)$ of the inverse channel an the received signal y(n) like the following equation 13.

$$x(n)=[x(n)*h(n)]h^{-1}(n) \quad \text{[Equation 13]}$$

where, * is a linear convolution.

Meanwhile, a ZF equalization in the frequency is a method for dividing the received signal in the frequency domain like the following equation 14 by the frequency response and inverse-transforming the divided value into the time domain.

$$x(n) = Z^{-1}\left\{\frac{X(z) \cdot H(z)}{H(z)}\right\} \quad \text{[Equation 14]}$$

The methods described above have advantages and drawbacks, respectively. The time domain ZF equalization can remove the interference of an adjacent signal through the convolution regardless of the length of the impulse response of the inverse channel, but requires very much hardware for implementing a transversal filter suitable the length. Besides, since the frequency domain ZF equalization performs a circular convolution instead of the linear convolution in the time domain, so that there is a drawback that the performance of the equalizer is deteriorated by Aliasing or an adjacent block interference phenomenon when the length of the impulse response of the inverse channel is long to be similar with the block size of the FFT and an advantage of processing the inverse channel impulse response having more length with same hardware because of implementation simpler than the transversal filter (or removing a ghost signal coming through more longer path).

However, the drawback of the zero forcing (ZF) equalizer are that in a case that a very deeper null is generated in the frequency response of the channel because magnitudes of signals entered through multiple path are about the same (namely, roots of the impulse response exist on a unit circle or the vicinity), the inverse value of the vicinity of the null does not exist or becomes very large value so that the equalization cannot be performed, or if possible, the noise enhancement becomes very large.

A first problem can be resolved by existing the inverse values always finite by preparing previously the inverse values into the ROM table instead of obtaining the inverse values of the estimated channel impulse response as proposed by the present invention.

A second problem can be also resolved by using the noise removing unit 400 utilizing the noise predictor proposed in the next paragraph by the present invention.

Figure 6:
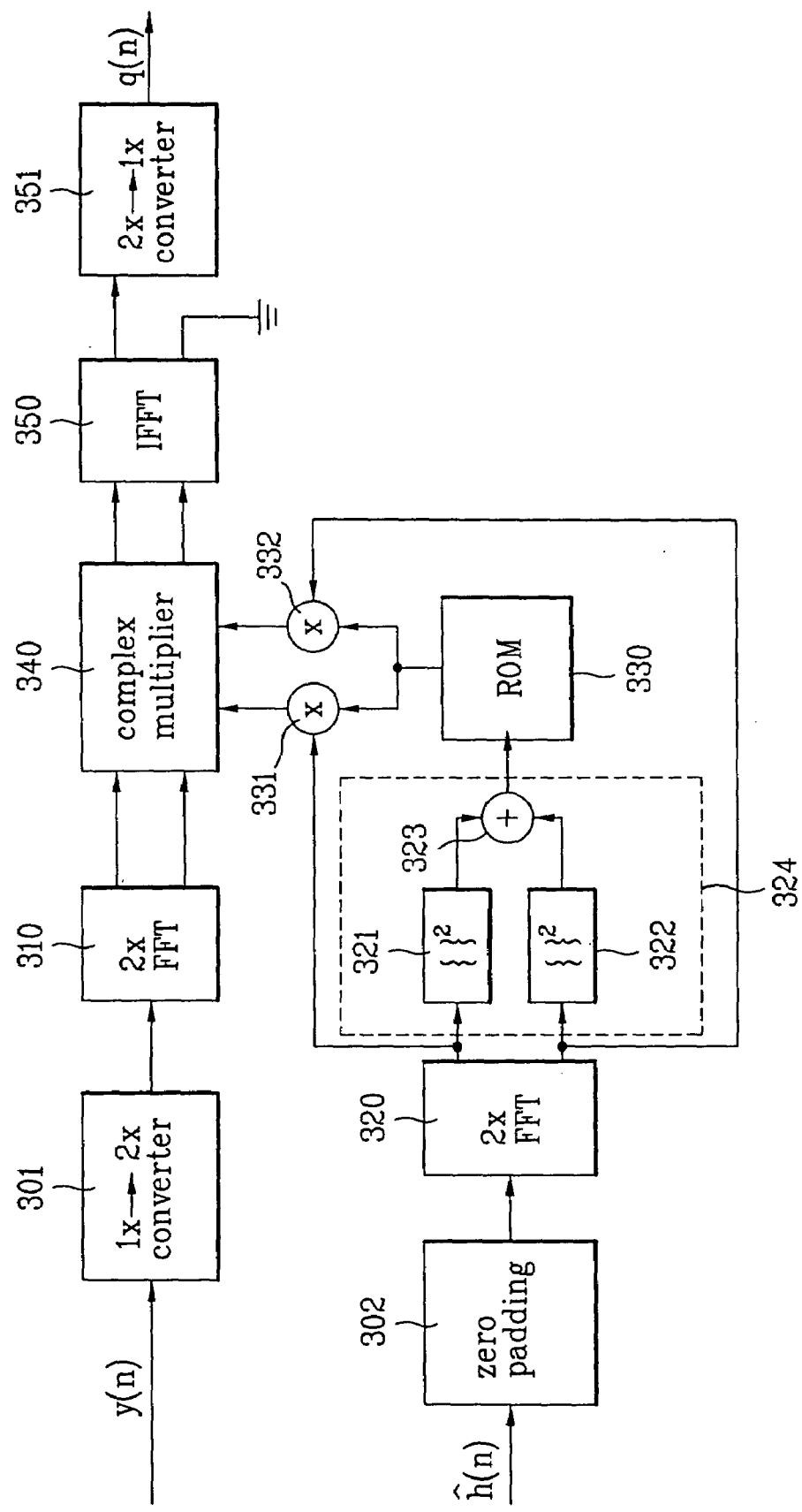
FIG. 6 illustrates a detail block diagram of a frequency domain zero forcing channel distortion compensation unit of FIG. 1.

FIG. 6 illustrates a detail block diagram of an embodiment of a frequency domain zero forcing (ZF) channel distortion compensation unit 300 proposed by the present invention, includes a 1x→2x converter 301 for enabling 2x Fast Fourier Transform by superposing a data block of a signal y(n) being received on a previous data block, a zero padding machine 302 for padding the estimated channel impulse response ĥ(n) in the channel estimation unit 200 with 0 (zero) to be suitable a 2x Fast Fourier Transform block, a first Fast Fourier Transform unit 310 for converting a 2x data block of the 1x→2x converter 301 into the frequency domain, a second Fast Fourier Transform unit 320 for converting the estimated channel impulse response padded with 0 (zero) into the frequency domain, an address generator 324 for generating an address of a rear ROM table 320 by squaring of a real number and a complex number outputs of the second Fast Fourier Transform unit 320 and adding the squared numbers, the ROM table 330 for receiving the address of the address generator and outputting an inverse value of the address, a first and a second multipliers 331 and 332 for multiplying an output value from the ROM table 330 to the real number and the complex number of the second Fast Fourier Transform unit 320 respectively, a complex multiplier 340 for performing a complex-multiplication of the complex output value of the frequency domain receipt data outputted from the first Fast Fourier Transform unit 310 with the complex output value of the first and the second multipliers 331 and 332, an inverse Fast Fourier Transform unit 350 for inverse-converting an output value from the complex multiplier 340 into the time domain, and a 2x→1x converter 351 for extracting only data of a 1x block from the inverse Fast Fourier Transform unit 350 of a 2x block.

By referring FIG. 6, if it were assumed that a block size to perform the FFT is 2M, the received symbol y(n) is blocked into M data and inputted into a 1x→2x converter 301. The 1x→2x converter 301 reconstructs new 2M symbol blocks by summing M data blocks inputted together with rear M data of the previous FFT block data and outputs the reconstructed blocks to the first FFT unit 310.

Like this, the FFT with superposing between 2M data blocks by M data blocks is for making the frequency domain equalizing procedure same with the linear convolution because the frequency domain equalizing procedure is the same with the circular convolution in the time domain.

The first FFT unit 310 receives 2M time domain data blocks, and transforms and outputs the 2M time domain data blocks into 2M frequency domain data blocks to the complex multiplier 340.

Moreover, the impulse response ĥ(n) of the estimated channel in the channel estimation unit 200 is inputted into the zero padding machine 302, the zero padding machine 302 adds 0 (zero) value as much as 2M−N to a rear portion of the channel impulse response and outputs the added value to the second FFT unit 320 so as to convert the output in the frequency domain. Here, N is a length of the estimated channel impulse response.

At that time, it is assumed that the output of the second FFT unit 320 is Ĥ(k), Ĥ(k) is expressed as a complex value, and its inverse value can be easily obtained like the following equation 14, and the inverse values is tabled and stored in the ROM 330 in the present invention.

$$\frac{1}{\hat{H}(k)} = \frac{1}{\hat{H}_r(k) + j\hat{H}_i(k)} \quad \text{[Equation 15]}$$

-continued $$= \frac{\hat{H}_r(k) - j\hat{H}_i(k)}{\hat{H}_r(k)^2 + \hat{H}_i(k)^2}$$

In the equation 15, $\hat{H}(k)$ and $\hat{H}_r(k)$ are set as a real value and a complex value of $\hat{H}(k)$, respectively.

At that time, A(k) is defined as the following equation 16.

$$A(k)=\hat{H}_r(k)^2+\hat{H}_i(k)^2 \qquad \text{[Equation 16]}$$

The value of the A(k) is used as the address of the ROM 330 like the following equation 17.

$$ROM[A(k)] = \frac{1}{A(k)} \qquad \text{[Equation 17]}$$

At that time, by filling the ROM value to be the equation 17, the inverse value of the channel always having finite value can be obtained like the following equation 18.

$$\frac{1}{\hat{H}(k)} = ROM[A(k)] \cdot \hat{H}_r(k) - jROM[A(k)]\hat{H}_i(k) \qquad \text{[Equation 18]}$$

The equation 16 generating the address of the ROM 330 can be implemented by using a first squaring machine 321, a second squaring machine 322 and an adder 323 of the address generator illustrated FIG. 6, the ROM table 330 is filled with data to satisfy the equation 17. Moreover, the equation 18 is realized through the first multiplier 331 and the second multiplier 332.

Since the outputs from the first multiplier 331 and the second multiplier 332 are a real portion and a complex portion of $$\frac{1}{\hat{H}(k)},$$

the practical frequency domain ZF equalization is achieved by the complex multiplication of the output from the first FFT unit 310 and the outputs from the first and the second multipliers 331 and 332 in the complex multiplier 340.

The output from the complex multiplier 340 is inputted into the IFFT unit 350 and converted into the time domain, a real portion among the complex data with 2M blocks converted into the time domain is inputted into the 2x→1x converter 351, and a complex portion is directly dumped. The 2x→1x converter 351 extracts and outputs only M data among the real data with 2M blocks, and wastes the rest M data.

In this embodiment of the present invention, an example for realization of the signal y(n) of real input is described, however, it is understood that the complex input signal can be also applied by the same method so that the frequency equalization can be realized.

Meanwhile, if it is assumed that the frequency equalization in the channel distortion compensation unit 300 is perfectly completed, the signal inputted into the noise removing unit 400 from the channel distortion compensation unit 300 would be regarded as a sum of the original signal and the colored noise.

Namely, let the input signal of the noise removing unit 400 q(n), q(n) is expressed as following equation 19.

$$q(n) = x(n) + v(n) \qquad \text{[Equation 19]}$$
$$= x(n) + \sum h^{-1}(k)w(n-k)$$

where, x(n) is the original signal equalized in ideal and v(n) is the colored noise that are outputs generated by the convolution the impulse response of the inverse channel with the white noise w(n) added at receipt.

Therefore, the noise predictor 410 of the noise removing unit 400 obtains $\hat{v}$(n) forward-predicted by projecting the colored noise v(n) on a plane spread by a random vector {v(n−1), v(n−2), . . . , v(n−L)} by using the fact that the v(n) relates to a previous value. A subtracter 420 subtracts the predicted value $\hat{v}$(n) from the v(n) so that the enhanced noise remove is performed. In other words, the noise enhanced for the equalization can be removed by whitening the v(n) by subtracting the predicted value $\hat{v}$(n) from the v(n).

Figure 7:
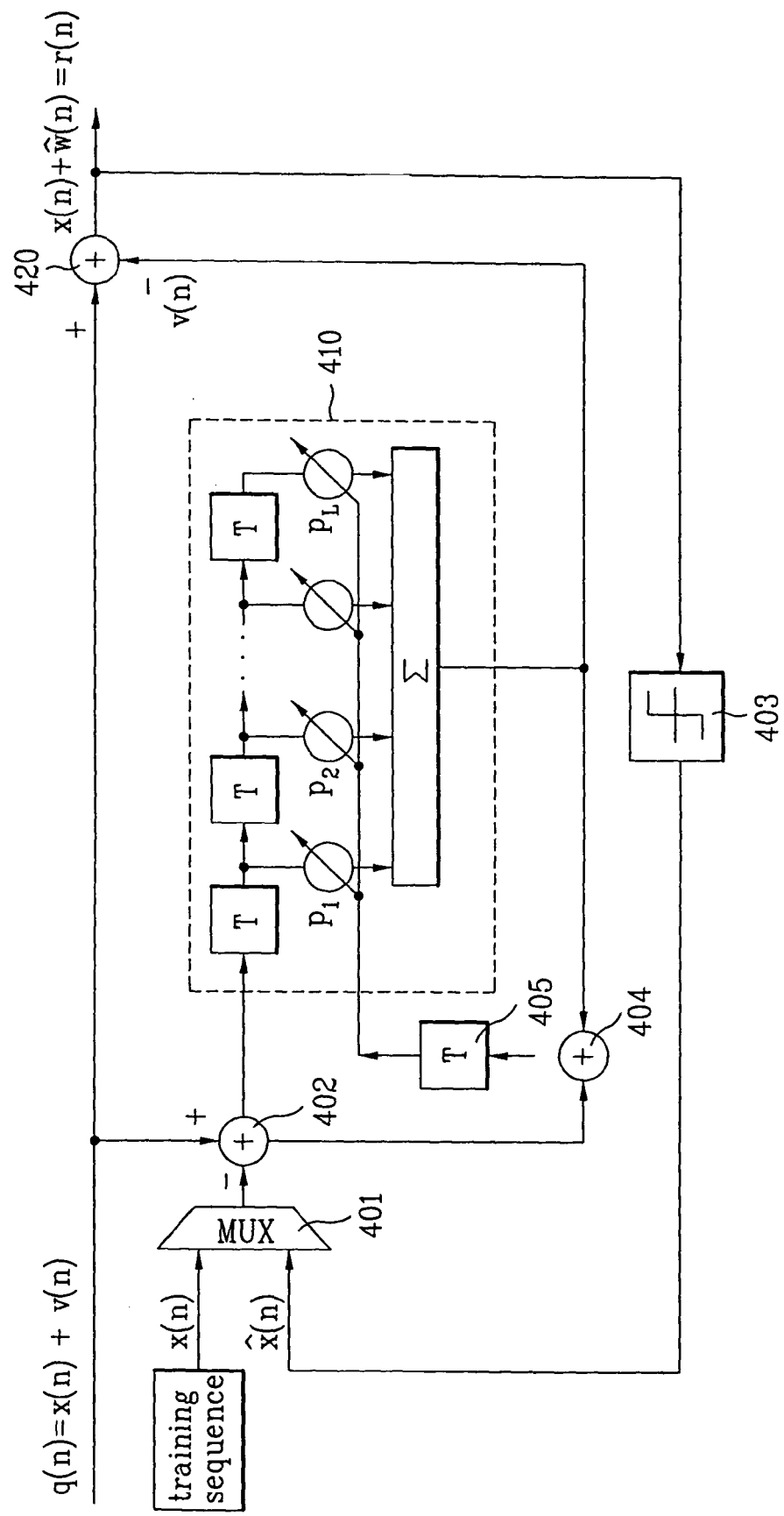
FIG. 7 illustrates a detail block diagram of a noise removing unit of FIG. 1.

FIG. 7 illustrates a detail block diagram of the noise removing unit 400, and includes a multiplexer (MUX) 401 for selecting and outputting the training sequence during the training period and a determined value of the noise-removed signal during the data block, a first subtracter 402 for extracting only the colored noise v(n) by subtracting the output of the MUX from the output of the channel distortion compensation unit 300, a noise predictor 410 for receiving and delaying an output from the first subtracter 402 and generating $\hat{v}$(n) by predicting the v(n) by using the delayed value v(n−1), . . . , v(n−L), a second subtracter 420 for whitening the noise by subtracting the noise $\hat{v}$(n) predicted in the noise predictor 410 from the output q(n) of the channel distortion compensation unit 300, and a determiner 403 for determining the noise of which the enhanced noise is removed in the second subtracter 420, namely the whitened signal and outputting the determined result to the MUX 405.

Here, a third subtracter 404 and a delayer 405 of which description are omitted are for controlling update of the coefficient of the predictor 410. The third subtracter 404 estimates and outputs the difference between the output signals from the first subtracter 402 and the noise predictor 410, and the delayer 405 delays the input signal by a unit time and outputs the delayed signal the respect multipliers of the noise predictor 410.

By referring FIG. 7, like the equation 19, in the signal q(n) outputted from the channel distortion compensation unit 300, the original signal x(n) is contained together with the colored noise v(n), and the signal q(n) is outputted to the first subtracter 402 and the second subtracter 420 of the noise removing unit 400.

The first subtracter 402 extracts only the colored noise v(n) by subtracting the original signal outputted through the MUX 401 from the output q(n) of the channel distortion compensation unit 300.

At that time, the MUX 401 outputs the original signal to the first subtracter 402. The MUX 401 selects and outputs the training sequence for the training time and the determined value of the noise-removed signal for the data block to the first subtracter 402.

The colored noise signal v(n) extracted in the first subtracter 402 is inputted into a first delayer, connected in series, of the noise predictor 410. Outputs of respective delayers of the noise predictor 410 are multiplied by coefficients of the predictor in the respective multipliers, all the result of the multiplication is added in the adder and outputted to the second subtracter 420. At that time, since the coefficients of the noise predictor 410 exist after the first delayer, the output $\hat{v}(n)$ of the noise predictor 410 is not expressed with the following equation 20, but the following equation 21.

$$\hat{v}(n) = \sum_{k=0}^{L} p_k v(n-k) \quad \text{[Equation 20]}$$

$$\hat{v}(n) = \sum_{k=1}^{L} p_k v(n-k) \quad \text{[Equation 21]}$$

where, $p_k$ means a k-th coefficient of the noise predictor 410, and L is an order of the noise predictor 410.

The cost function J is an average square predicted error, and is defined like the following equation 22.

$$J = E\{e(n)^2\} \quad \text{[Equation 22]}$$
$$= E\{(v(n) - \hat{v}(n))^2\}$$
$$= E\left\{\left(v(n) - \sum_{k=1}^{L} p_k v(n-k)\right)^2\right\}$$

where, E means an operation for obtaining probability expected value, and e(n) is a predicted error.

In order to obtain $p_k$, k=1, 2, ..., L to minimize the cost function J, the cost function J is differentiated for $p_k$, and then is expressed like the following equation 23, $$\frac{\partial J}{\partial p_k} = -2 \cdot E\{e(n) \cdot v(n-k)\} \quad \text{[Equation 23]}$$

In order to update a coefficient using the least mean square (LMS) algorithm, the instantaneous value instead of the probability expected value is used in the equation 23 and the equation 23 is expressed with the following equation 24.

$$E\{e(n) \cdot v(n-k)\} \approx e \cdot v(n-k) \quad \text{[Equation 24]}$$

Therefore, when $p_k(n)$ is the k-th predict coefficient updated at a n-th time, an updating equation of the coefficient according to time can be expressed with the following equation 25.

$$p_k(n+1) = p_k(n) + \mu \cdot v(n-k), k=1,2, \ldots, L \quad \text{[Equation 25]}$$

The output $\hat{v}(n)$ predated by using the updated coefficient is directly inputted into the second subtracter 420 so as to whiten the received the noise of the signal q(n). Here, the coefficient update is performed by the control of the subtracter 404 and the delayer 405.

Therefore, the output r(n) of the noise removing unit 400 becomes the following equation 26.

$$r(n) = x(n) + \hat{w}(n) \quad \text{[Equation 26]}$$
$$= x(n) + (v(n) - \hat{v}(n))$$

where, $\hat{w}(n)$ means the whitened noise. The output of the noise removing unit 400 is a channel-equalized and noise-removed signal and almost original signal.

Therefore, since the decision value that the determiner 403 determines the value of the equation 26 would be also the original signal, the performance does never deteriorate even though the noise predictor 410 is operated not by using the training sequence at the input terminal but only by using the decision value.

Figure 8:
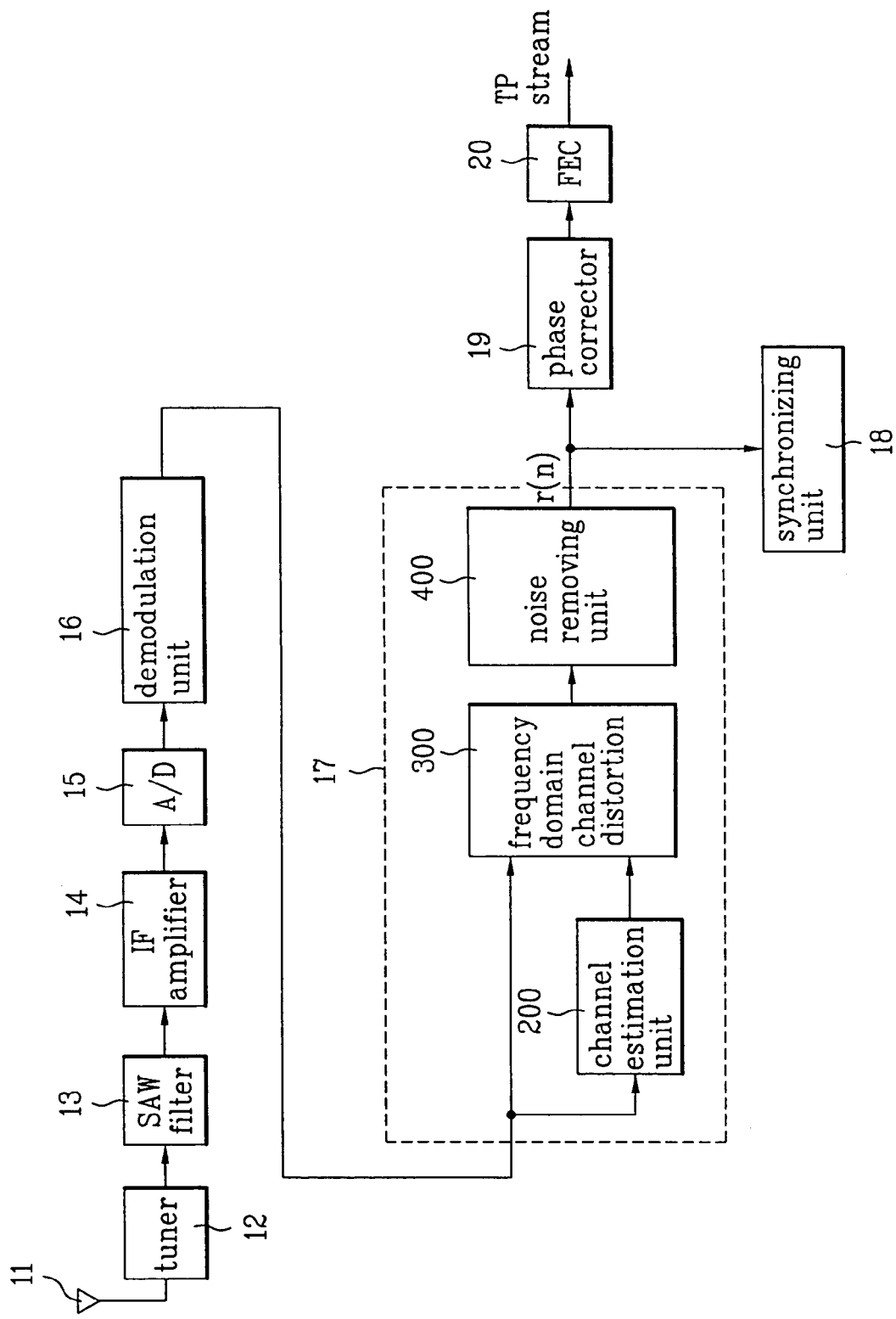
FIG. 8 illustrates a block diagram as an example of a digital TV receiver adopting the channel equalizer according to the present invention.

FIG. 8 illustrates a block diagram as an example of a VSB digital TV receiver adopting the channel equalizer according to the present invention, when a radio frequency signal modulated in the VSB method is received through an antenna 11, a tuner 12 selects only special channel frequency which a user want to see, lowers the VSB signal of the RF band contained in the channel frequency, and filters other channel signals properly.

Moreover, an output signal of the tuner 12 for converting a spectrum of an arbitrary channel into an IF passing band signal passes a surface acoustic wave (SAW) filter 13 adopted to remove adjacent signal and the noise signal.

At that time, since all information of the digital broadcasting signal, for example, exists within from a intermediate frequency of 44 MHz to a band of 6 MHz, the SAW filter 13 keeps and outputs only band of 6 MHz where the information exist and removes all the rest from the output of the tuner 12 to an IF amplifier 14.

The IF amplifier 14 multiplies a previous estimated gain value by the signal outputted from the SAW filter 13 so as to make magnitude of the signal outputted to a rear side analog/digital (A/D) converter 15. Therefore, the A/D converter 15 always receives and digitalizes signals with same magnitude from the IF amplifier 14. The passing band signal digitalized in the A/D converter 15 undergoes the process such as the carrier restoration in a demodulation unit 16, the symbol clock restoration and a DC remove, and is inputted into a channel equalizer 17.

The channel equalizer 17, as illustrated in FIG. 1, includes the channel estimation unit 200, the channel distortion compensation unit 300, the noise removing unit 400, and removes and outputs a linear distortion causing the interference between symbols contained in the digital signal of the baseband and a ghost generated by being reflected by a building or a mountain, by using a digital signal of baseband and a synchronizing signal to a synchronizing unit 18 and a phase corrector 19.

The constructions and functions of the channel estimation unit 200, the channel distortion compensation unit 300, and the noise removing unit 400 are already described in detail by referring FIGS. 1 to 7 and now the description will be omitted.

Meanwhile, the synchronizing unit 18 restores a data segment synchronizing signal and a field synchronizing signal inserted from the channel equalized signal when the transmission. The synchronizing signals are outputted to the phase corrector 19 and an FEC unit 20.

The phase corrector 19 removes a vestigial phase noise caused from the tuner 12 from the output signal of the channel equalizer 17 and outputs the noise-removed output signal to the FEC unit 20. The FEC unit 20 restores a transmission signal from the phase-noise-removes signal by using the synchronizing signals and outputs the restored transmission signal in the form of transport stream.

As described above, the frequency domain ZF channel equalizer using the channel estimator and the noise remover according to the present invention has advantages as follows.

First, by using a precise channel estimator according to the LS method, the transmission channel can be precisely estimated regardless of the characteristic of the transmission channel (for example, a single path and multiple path, a static channel and a time varying channel, and et cetera). Therefore, since the channel can be precisely compensated for if the channel equalizer performs the channel equalization by using the estimated transmission channel, its performance is superior than that of the conventional equalizer (for example, an equalizer operated at a blind state without knowing the channel status in the time domain or an equalizer operated at the blind state after using only an initial coefficient as the channel estimation value).

Second, an equalizer operated in the time domain does not steadily operate when the main path depends upon time because that all ISS component corresponding to the rest path should be removed while the main path among the multiple path is remained, so that the equalizer had disadvantage that the frame synchronization is easily broken. On the contrary, the channel equalizer according tot the present invention supplies a firm frame synchronization with respect to even the time varying multiple path channel by performing the channel equalization in the frequency domain so that can exhibits superior performance even at a mobile channel.

Third, the conventional zero forcing channel equalizer causes a diverse phenomenon because the inverse value of the frequency response does not exist if a deep null exists in the frequency response of the channel (for example, the 0 dB ghost channel state that roots of the impulse response of the channel exist on the unit circle). To the contrary, the ZF frequency equalizing procedure estimates the address at first when the estimation of the inverse value and uses the inverse value the value of the ROM table outputted from the address, and then always a finite value. Moreover, since the channel equalizer according to the present invention is operated to minimize the vestigial ISI after the equalization and the enhanced noise when the equalization through the noise remover, the channel equalizer of the present invention can be operated steadily even at the 0 dB ghost channel as described above.

Fourth, since the FFT implemented by the hardware simpler than the transversal filter of the time domain can be used by which the equalization is performed not the time domain but the frequency domain, longer equalizing range can be formed. By doing so, the equalization performance with respect to a pre-long ghost or a post-long ghost is superior to that of the time domain equalizer.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A channel equalizer for restoring an original signal from a digital TV receiving signal having passed through a channel, comprising:
   a channel estimation unit for estimating a finite impulse response estimation value of a channel by estimating an impulse response of a transmission channel from a received signal having passed through the channel; and
   a channel distortion compensation unit for compensating for the channel distortion of the received signal by using the time impulse response estimated in a frequency domain after converting the received signal and the estimated impulse response into the frequency domain, respectively, and for converting the received signal into a time domain again.

2. The channel equalizer as claimed in claim 1, wherein the channel estimation unit comprises:
   a cross-correlation value generator for detecting a training time and calculating a cross-correlation value p(n) between a training sequence having passed through the channel during the training time and a predetermined training sequence at a receiver;
   an instantaneous estimation unit for estimating an instantaneous channel value $\hat{h}_i(n)$, (where $n=-N_a, -N_a+1, \ldots, 0, \ldots, N_c-1, N_c$) by performing a matrix multiplication of coefficients of an inverse matrix of an autocorrelation matrix $R^{-1}$ of a predetermined training signal and cross-correlation values; and
   an estimation channel filter for calculating a mean value between a pre-stored estimation channel $\hat{h}(n-1)$ of a previous frame and a present instantaneous channel being outputted from the instantaneous channel $\hat{h}_i(n)$ estimation unit and outputting the mean value.

3. The channel equalizer as claimed in claim 2, wherein the cross-correlation value generating unit comprises:
   a plurality of delayers, connected in serial as much as a training signal, for delaying the input signal sequentially;
   a plurality of multipliers for multiplying outputs of the respect delayers by respect corresponding training signals $t_i$, $0 \leq i \leq L-1$; and
   an adder for adding all the output of the respect multipliers and outputting the cross-correlation value p(n).

4. The channel equalizer as claimed in claim 2, wherein the instantaneous channel estimation unit comprises:
   a ROM table for storing a coefficient of an inverse matrix $R^{-1}$ of the autocorrelation matrix of the training sequence and outputting respect column values of $R^{-1}$ in parallel;
   a plurality of delayers, connected in serial, for delaying the cross-correlation value p(n) sequentially;
   a plurality of multipliers for performing a matrix multiplication of the outputs of the respect delayers with the respect outputs of the ROM table; and
   an adder for adding the outputs of the respect multipliers and outputting the instantaneous channel value $\hat{h}_i(n)$.

5. The channel equalizer as claimed in claim 1, wherein the channel distortion compensation unit comprises:
   a first Fast Fourier Transform unit for transforming the received signal from the time domain to the frequency domain;
   a second Fast Fourier Transform unit for transforming the channel impulse response estimated in the channel estimation unit from the time domain to the frequency domain;
   a ROM for storing inverse values of the channel impulse response transformed into the frequency domain in a form of table;
   a complex multiplier for correcting the distortion of the received signal in the frequency domain outputted from the first Fast Fourier Transform unit by using a signal outputted from the ROM; and
   an inversed Fast Fourier Transform unit for inverse-converting the signal in the frequency signal domain outputted from the complex multiplier.

6. The channel equalizer as claimed in claim 1, wherein the channel distortion compensation unit comprises:
   a 1x→2x converter for enabling 2x Fast Fourier Transform by superposing a data block of a signal being received on a previous data block;
   a zero padding machine for padding the estimated channel impulse response $\hat{h}(n)$ in the channel estimation unit with 0 (zero) to be suitable a 2x Fast Fourier Transform block;

a first Fast Fourier Transform unit for converting a 2x data block of the 1x→2x converter into the frequency domain;
a second Fast Fourier Transform unit for converting the estimated channel impulse response padded with 0 (zero) into the frequency domain;
an address generator for generating an address by squaring a real number and a complex number outputs of the second Fast Fourier Transform unit and adding the squared numbers;
a ROM for pre-storing an inverse value of the channel impulse response and outputting an inverse value corresponding to an address of the address generator;
a multiplier for multiplying an output value from the ROM to the real number by the complex number of the second Fast Fourier Transform, respectively;
a complex multiplier for performing a complex-multiplication of a complex output value of the frequency domain receipt data outputted from the first Fast Fourier Transform unit with a complex output value of the multiplier;
an inverse Fast Fourier Transform unit for inverse-converting an output value from the complex multiplier into the time domain; and
a 2x→1x converter for extracting only data of 1x block from the inverse Fast Fourier Transform unit.

7. The channel equalizer as claimed in claim 1, further comprising a noise removing unit for estimating an enhanced noise for the equalization from the output of the channel distortion compensation unit and for removing the enhanced noise and a vestigial symbol interference component contained in the time domain signal.

8. The channel equalizer as claimed in claim 7, wherein the noise removing unit comprises:
a noise predictor for estimating an enhanced noise by extracting only colored noise from the output of the channel distortion compensation unit; and
a subtracter for whitening the noise by subtracting the noise predicted by the noise predictor the output from the channel distortion compensation unit.

9. The channel equalizer as claimed in claim 7, wherein the noise removing unit comprises:
a selector for selecting the training sequence during the training period and a determined value of the noise-removed signal during the data block and outputting the selected signal as an original signal;
a first subtracter for extracting only the colored noise $v(n)$ by subtracting the output of the selector from the output of the channel distortion compensation unit;
a noise predictor for receiving and delaying an output from the first subtracter sequentially, predicting $v(n)$ by using the delayed value, and generating $\hat{v}(n)$;
a second subtracter for whitening the noise by subtracting the noise predicted $\hat{v}(n)$ in the noise predictor from the output of the channel distortion compensation unit; and
a determiner for determining the noise of which the enhanced noise is removed in the second subtracter and outputting the determined result to the selector.

10. A channel equalizer for restoring an original signal from a digital TV receiving signal having passed through a channel, comprising:
a channel estimation unit for estimating a finite impulse response estimation value of a channel by estimating an impulse response of a transmission channel from a received signal having passed through the channel;
a channel distortion compensation unit for compensating for the channel distortion of the received signal by using the time impulse response estimated in a frequency domain after converting the received signal and the estimated impulse response into the frequency domain, respectively, and for converting the received signal into a time domain again; and
a noise removing unit for estimating a noise enhanced during the equalizing from the output of the channel distortion compensation unit and for removing an enhanced noise and a vestigial symbol interference component contained in the time domain signal.

11. The channel equalizer as claimed in claim 10, wherein the channel estimation unit comprises:
a cross-correlation value generator for detecting a training time and calculating a cross-correlation value $p(n)$ between a training sequence having passed through the channel during the training time and a predetermined training sequence at a receiver;
an instantaneous estimation unit for an instantaneous channel value by matrix multiplication for estimating an instantaneous value $\hat{h}_i(n)$, (where $n=-N_a, -N_a+1, \ldots 0, \ldots, N_c-1, N_c$) by matrix multiplication of a coefficient of an inverse matrix $R^{-1}$ of an autocorrelation matrix of the training sequence and the cross-correlation value; and
an estimation channel filter for calculating a mean value between a pre-stored estimation channel $\hat{h}(n-1)$ of a previous frame and a present instantaneous channel being outputted from the instantaneous channel $\hat{h}_i(n)$ estimation unit and outputting the mean value.

12. The channel equalizer as claimed in claim 11, wherein the cross-correlation value generator comprises:
a plurality of delayers, connected in serial as much as a training signal, for delaying the input signal sequentially;
a plurality of multipliers for multiplying outputs of the respect delayers by respect corresponding training signals $t_i$, $0 \leq i \leq L-1$; and
an adder for adding all the output of the respect multipliers and outputting the cross-correlation value $p(n)$.

13. The channel equalizer as claimed in claim 11, wherein the instantaneous channel estimation unit comprises:
a ROM table for storing a coefficient of an inverse matrix $R^{-1}$ of the autocorrelation matrix of the training sequence and outputting respect column values of $R^{-1}$ in parallel;
a plurality of delayers, connected in serial, for delaying the cross-correlation value $p(n)$ sequentially;
a plurality of multipliers for performing a matrix multiplication of the outputs of the respect delayers with the respect outputs of the ROM table; and
an adder for adding the outputs of the respect multipliers and outputting the instantaneous channel value $\hat{h}_i(n)$.

14. The channel equalizer as claimed in claim 11, wherein the estimation channel filter comprises:
n multipliers for storing an average impulse response estimation value of the previous frame;
a multiplier for multiplying the output of the delayer by a first coefficient $\beta$;
an adder for adding the output of the instantaneous channel estimation unit to the output of the multiplier and feeding the added result back the delayer; and
a multiplier for multiplying a second coefficient $1-\beta$ by an output of the adder and outputting the multiplied result to the channel distortion compensation unit.

15. The channel equalizer as claimed in claim 10, wherein the channel distortion compensation unit comprises:

a first Fast Fourier Transform unit for transforming the received signal from the time domain to the frequency domain;

a second Fast Fourier Transform unit for transforming the channel impulse response estimated in the channel estimation unit from the time domain to the frequency domain;

a ROM for storing inverse values of the channel impulse response transformed into the frequency domain in a form of table;

a multiplier for correcting the distortion of the received signal in the frequency domain outputted from the first Fast Fourier Transform unit by using a signal outputted from the ROM; and an inverse Fast Fourier Transform unit for inverse-converting the signal in the frequency signal domain outputted from the multiplier.

16. The channel equalizer as claimed in claim 10, wherein the channel distortion compensation unit comprises:

a 1x→2x converter for enabling 2x Fast Fourier Transform by superposing a data block of a signal being received on a previous data block;

a zero padding machine for padding the estimated channel impulse response ĥ(n) in the channel estimation unit with 0 (zero) to be suitable a 2x Fast Fourier Transform block;

a first Fast Fourier Transform unit for converting a 2x data block of the 1x→2x converter into the frequency domain;

a second Fast Fourier Transform unit for converting the estimated channel impulse response padded with 0 (zero) into the frequency domain;

an address generator for generating an address by squaring a real number and a complex number outputs of the second Fast Fourier Transform unit and adding the squared numbers;

a ROM for pre-storing an inverse value of the channel impulse response and outputting an inverse value corresponding to an address of the address generator;

a multiplier for multiplying an output value from the ROM to the real number by the complex number of the second Fast Fourier Transform, respectively;

a complex multiplier for performing a complex-multiplication of a complex output value of the frequency domain receipt data outputted from the first Fast Fourier Transform unit with a complex output value of the multiplier;

an inverse Fast Fourier Transform unit for inverse-converting an output value from the complex multiplier into the time domain; and a 2x→1x converter for extracting only data of 1x block from the inverse Fast Fourier Transform unit.

17. The channel equalizer as claimed in claim 16, wherein the zero padding machine adds a 0 (zero) value as much as 2M−N (where N is a length of the estimated channel impulse response) to a rear portion of the estimated channel impulse response when a block size that the first Fast Fourier Transform unit performs the Fast Fourier Transform is assumed to 2M.

18. The channel equalizer as claimed in claim 16, wherein the ROM stores the inverse value of the channel impulse response to be $$ROM[A(k)] = \frac{1}{A(k)}.$$

19. The channel equalizer as claimed in claim 10, wherein the noise removing unit comprises:

a noise predictor for estimating an enhanced noise by extracting only colored noise from the output of the channel distortion compensation unit; and a subtracter for whitening the noise by subtracting the noise predicted by the noise predictor the output from the channel distortion compensation unit.

20. The channel equalizer as claimed in claim 10, wherein the noise removing unit comprises:

a selector for selecting the training sequence during the training period and a determined value of the noise-removed signal during the data block and outputting the selected signal as an original signal;

a first subtracter for extracting only the colored noise v(n) by subtracting the output of the selector from the output of the channel distortion compensation unit;

a noise predictor for receiving and delaying an output from the first subtracter sequentially, predicting v(n) by using the delayed value, and generating v̂(n);

a second subtracter for whitening the noise by subtracting the noise predicted v̂(n) in the noise predictor from the output of the channel distortion compensation unit; and a determiner for determining the noise of which the enhanced noise is removed in the second subtracter and outputting the determined result to the selector.

21. The channel equalizer as claimed in claim 20, wherein the noise predictor comprises:

a plurality of delayers for delaying the output of the first subtracter sequentially;

a plurality of multipliers for multiplying the outputs of the respect delayers by respective predict coefficients; and an adder for adding and outputting outputs of the respects multipliers.

22. A digital TV receiver utilizing a channel equalizer comprising:

a tuner for selecting a desired frequency of a channel by tuning when a vestigial sideband modulated signal is received through an antenna and converting the selected frequency into an intermediate frequency signal;

a demodulator for digitalizing the intermediate signal outputted from the tuner and demodulating the digitalized signal into a baseband signal;

a channel estimation unit for estimating a finite impulse response estimation value of a channel by estimating an impulse response of a transmission channel from the output signal of the demodulator;

a channel distortion compensation unit for compensating for the channel distortion of the received output signal by using the time impulse response estimated in a frequency domain after converting the received output signal and the estimated impulse response into the frequency domain, respectively, and for converting the received output signal into a time domain again;

a noise removing unit for estimating a noise enhanced during the equalizing from the output of the channel distortion compensation unit and for removing an enhanced noise and a vestigial symbol interference component contained in the time domain signal; and an error correcting unit for correcting a phase and error of data outputted from the noise removing unit and outputting the corrected data for decoding.

23. The digital TV receiver as claimed in claim 22, wherein the channel estimation unit comprises:
   a cross-correlation value generator for detecting a training time and calculating a cross-correlation value p(n) between a training sequence having passed through the channel during the training time and a predetermined training sequence at a receiver;
   an instantaneous estimation unit for an instantaneous channel value $\hat{h}_i(n)$, (where $n=-N_a-N_a+1, \ldots, 0, \ldots, N_c-1, N_c$) by performing a matrix multiplication of coefficients of an inverse matrix $R^{-1}$ of an autocorrelation matrix of a predetermined training signal and cross-correlation values; and
   an estimation channel filter for calculating a mean value between a pre-stored estimation channel $\hat{h}(n-1)$ of a previous frame and a present instantaneous channel being outputted from the instantaneous channel $\hat{h}_i(n)$ estimation unit and outputting the mean value.

24. The digital TV receiver as claimed in claim 23, wherein the instantaneous channel estimation unit comprises:
   a ROM table for storing a coefficient of an inverse matrix $R^{-1}$ of the autocorrelation matrix of the training sequence and outputting respect column values of $R^{-1}$ in parallel;
   a plurality of delayers, connected in serial, for delaying the cross-correlation value p(n) sequentially;
   a plurality of multipliers for performing a matrix multiplication of the outputs of the respect delayers with the respect outputs of the ROM table; and
   an adder for adding the outputs of the respect multipliers and outputting the instantaneous channel value $\hat{h}_i(n)$.

25. The digital TV receiver as claimed in claim 22, wherein the channel distortion compensation unit comprises:
   a first Fast Fourier Transform unit for transforming the received signal from the time domain to the frequency domain;
   a second Fast Fourier Transform unit for transforming the channel impulse response estimated in the channel estimation unit from the time domain to the frequency domain;
   a ROM for storing inverse values of the channel impulse response transformed into the frequency domain in a form of table;
   a complex multiplier for correcting the distortion of the received signal in the frequency domain outputted from the first Fast Fourier Transform unit by using a signal outputted from the ROM; and
   an inversed Fast Fourier Transform unit for inverse-converting the signal in the frequency signal domain outputted from the complex multiplier.

26. The digital TV receiver as claimed in claim 22, wherein the channel distortion compensation unit comprises:
   a 1x→2x converter for enabling 2x Fast Fourier Transform by superposing a data block of a signal being received on a previous data block;
   a zero padding machine for padding the estimated channel impulse response $\hat{h}(n)$ in the channel estimation unit with 0 (zero) to be suitable a 2x Fast Fourier Transform block;
   a first Fast Fourier Transform unit for converting a 2x data block of the 1x→2x converter into the frequency domain;
   a second Fast Fourier Transform unit for converting the estimated channel impulse response padded with 0 (zero) into the frequency domain;
   an address generator for generating an address by squaring a real number and a complex number outputs of the second Fast Fourier Transform unit and adding the squared numbers;
   a ROM for pre-storing an inverse value of the channel impulse response and outputting an inverse value corresponding to an address of the address generator;
   a multiplier for multiplying an output value from the ROM to the real number by the complex number of the second Fast Fourier Transform, respectively;
   a complex multiplier for performing a complex-multiplication of a complex output value of the frequency domain receipt data outputted from the first Fourier Transform unit with a complex output value of the multiplier;
   an inverse Fast Fourier Transform unit for inverse-converting an output value from the complex multiplier into the time domain; and
   a 2x→1x converter for extracting only data of 1x block from the inverse Fast Fourier Transform unit.

27. The digital TV receiver as claimed in claim 22, wherein the noise removing unit comprises:
   a noise predictor for estimating an enhanced noise by extracting only colored noise from the output of the channel distortion compensation unit; and
   a subtracter for whitening the noise by subtracting the noise predicted by the noise predictor the output from the channel distortion compensation unit.

28. The digital TV receiver as claimed in claim 22, wherein the noise removing unit comprises:
   a selector for selecting the training sequence during the training period and a determined value of the noise-removed signal during the data block and outputting the selected signal as an original signal;
   a first subtracter for extracting only the colored noise v(n) by subtracting the output of the selector from the output of the channel distortion compensation unit;
   a noise predictor for receiving and delaying an output from the first subtracter sequentially, predicting v(n) by using the delayed value, and generating $\hat{v}(n)$;
   a second subtracter for whitening the noise by subtracting the noise predicted $\hat{v}(n)$ in the noise predictor from the output of the channel distortion compensation unit; and
   a determiner for determining the noise of which the enhanced noise is removed in the second subtracter and outputting the determined result to the selector.

* * * * *